United States Patent
Jeong et al.

(10) Patent No.: US 9,836,220 B2
(45) Date of Patent: Dec. 5, 2017

(54) DATA PROCESSING SYSTEM AND METHOD OF OPERATING THE SAME

(71) Applicant: SAMSUNG ELECTRONICS CO., LTD., Suwon-si, Gyeonggi-Do (KR)

(72) Inventors: Sung-Won Jeong, Suwon-si (KR); Sangwook Kim, Hwaseong-si (KR); Joonwon Lee, Seoul (KR); Jinkyu Jeong, Suwon-si (KR); Hwanju Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 233 days.

(21) Appl. No.: 14/791,714

(22) Filed: Jul. 6, 2015

(65) Prior Publication Data

US 2016/0110103 A1    Apr. 21, 2016

(30) Foreign Application Priority Data

Oct. 20, 2014 (KR) .................. 10-2014-0141691

(51) Int. Cl.
*G06F 12/00* (2006.01)
*G06F 3/06* (2006.01)
*G06F 12/08* (2016.01)

(52) U.S. Cl.
CPC ............ *G06F 3/061* (2013.01); *G06F 3/0659* (2013.01); *G06F 3/0688* (2013.01); *G06F 12/08* (2013.01)

(58) Field of Classification Search
None
See application file for complete search history.

(56) References Cited

U.S. PATENT DOCUMENTS

| | | |
|---|---|---|
| 6,081,883 A | 6/2000 | Popelka et al. |
| 7,596,643 B2 | 9/2009 | Merry, Jr. et al. |
| 7,681,004 B2 | 3/2010 | Bonella et al. |
| 7,870,350 B1 | 1/2011 | Yu et al. |
| 8,112,597 B2 | 2/2012 | Pattabiraman et al. |
| 8,151,020 B2 | 4/2012 | Merry, Jr. et al. |
| 8,239,645 B1 | 8/2012 | Sade et al. |
| 8,244,938 B2 | 8/2012 | Aronovich et al. |
| 8,281,060 B2 | 10/2012 | Supalov et al. |
| 8,504,773 B1 | 8/2013 | Glasco et al. |
| 8,560,750 B2 | 10/2013 | Sarkar |

(Continued)

OTHER PUBLICATIONS

US 8,621,155, 12/2013, Busch et al. (withdrawn)

*Primary Examiner* — John A Lane
(74) *Attorney, Agent, or Firm* — Volentine & Whitt, PLLC

(57) ABSTRACT

A method of operating a data processing system includes transmitting process information indicating that a first process is classified as a critical process or a non-critical process to a kernel area, wherein the process information is generated in an application area, and the application area and the kernel area define a host. When the first process is classified as a critical process based on the process information, a first fastpath write signal is provided, using the kernel area, to a memory system to perform a fastpath write operation of first data for performing the first process. When the first process is classified as a non-critical process, a first slowpath write signal is provided to the memory system to perform a slowpath write operation of the first data. The fastpath write operation has a higher write speed than the slowpath write operation.

14 Claims, 14 Drawing Sheets

(56) References Cited

U.S. PATENT DOCUMENTS

| | | |
|---|---|---|
| 8,700,842 B2 | 4/2014 | Dinker |
| 2006/0271815 A1* | 11/2006 | Mizuno ............... G06F 11/2071 |
| | | 714/6.12 |
| 2009/0094391 A1 | 4/2009 | Yim |
| 2009/0193184 A1 | 7/2009 | Yu et al. |
| 2010/0083247 A1 | 4/2010 | Kanevsky et al. |
| 2012/0317388 A1 | 12/2012 | Driever et al. |
| 2013/0297855 A1 | 11/2013 | Gupta et al. |
| 2014/0019707 A1 | 1/2014 | Benhase et al. |
| 2015/0186192 A1* | 7/2015 | Dyakin .................... G06F 9/54 |
| | | 719/313 |

* cited by examiner

DATA PROCESSING SYSTEM AND METHOD OF OPERATING THE SAME

CROSS-REFERENCE TO RELATED APPLICATION

This application claims the benefit of Korean Patent Application No. 10-2014-0141691, filed on Oct. 20, 2014, in the Korean Intellectual Property Office, the disclosure of which is incorporated herein in its entirety by reference.

BACKGROUND

Embodiments are directed to a data processing system and a method of operating the same, and in particular, to a data processing system that selectively manages data for performing processes and includes a unified memory device and a method of operating the same.

Conventionally, a hierarchical memory structure including a high-speed volatile memory and a low-speed non-volatile memory are included in a computer system. In the case of a volatile memory that inputs and outputs data at a relatively high speed, once power supply is stopped, all data is removed. Accordingly, a non-volatile memory that stably stores data is needed. However, the difference in performance of a main memory including a volatile memory and a secondary storage device including a non-volatile memory in the hierarchical memory structure and a characteristic of the secondary storage device that allows only access in a block unit are known as key factors for lower performance of a system in which input and output operations frequently occur. In addition, as capacities of a main memory and a secondary storage device are increased, the main memory and the secondary storage device consume more energy, dominantly occupying the entire system.

SUMMARY

Embodiments provide a data processing system that classifies processes, and based on classification results, selectively manages data for performing processes and a method of operating the same.

According to an aspect of the inventive concept, there is provided a method of operating a data processing system, wherein the method includes transmitting process information indicating that a first process is classified as a critical process or a non-critical process to a kernel area, wherein the process information is generated in an application area, and the application area and the kernel area define a host. When the first process is classified as a critical process based on the process information, a first fastpath write signal is provided to a memory system to perform a fastpath write operation of first data for performing the first process, wherein the first fastpath write signal is provided by using the kernel area. And when the first process is classified as a non-critical process, a first slowpath write signal is provided to the memory system to perform a slowpath write operation of the first data, wherein the fastpath write operation has a higher write speed than the slowpath write operation.

In some embodiments, the memory system may include a unified memory controller, and a unified memory device including a first non-volatile memory and a second non-volatile memory. The method further includes, in response to receiving the first fastpath write signal, providing a second fastpath write signal to the unified memory device by using the unified memory controller, and in response to receiving the first slowpath write signal, providing a second slowpath write signal to the unified memory device by using the unified memory controller.

In some embodiments, the method may further include: in the case when the memory device receives the second fastpath write signal, performing the fastpath write operation to store the first data in the first non-volatile memory; and, in the case when the memory device receives the second slowpath write signal, performing the slowpath write operation to store the first data in the second non-volatile memory.

In some embodiments, the method may further include, when the fastpath write operation has been completely performed, during an idle status period in which the first process is not being performed, performing a write operation of the first data to the second non-volatile memory, wherein the first data is previously stored in the first non-volatile memory.

In some embodiments, while the first process is performed, the process information may indicate whether the first process is a critical process or a non-critical process, based on whether a synchronous write request is received.

In some embodiments, the method may further include performing a write operation of second data for performing a second process, wherein the first process has priority over the second process, and the write operation of the second data is performed after a write operation of the first data for performing the first process has been completely performed.

In some embodiments, the method may further include, when the first process is classified as a non-critical process and the second process is classified as a critical process, re-classifying the first process as a critical process.

In some embodiments, the method may further include, when a write operation performed by the first process has been completely performed, re-classifying the first process as the non-critical process by using the application area.

In some embodiments, the method may further include: performing a write operation of third data for performing a third process; and, after the write operation of the first data for performing the first process has been completely performed, setting the second process to have priority over the third process and performing the write operation of the second data for performing the second process.

According to another aspect of the inventive concept, there is provided a method of operating a data processing system, wherein the method includes classifying a first process having priority over other processes as a non-critical process, converting first data for performing the first process into pieces of unit data, and transmitting some of the pieces of unit data to a memory device through a first queue area, by using a kernel area that defines a host. Also, the method includes: when a second process having priority over processes other than the first process is classified as a critical process, re-classifying the first process as a critical process in the kernel area; and, transmitting the remaining pieces of unit data to the memory device through a second queue area.

The method may further include, after the remaining pieces of unit data have been transmitted to the memory device through the second queue area, re-classifying the first process as a non-critical process in the kernel area.

The method may further include, after all of the pieces of unit data converted from the first data have been transmitted, converting second data for performing the second process into pieces of unit data, and transmitting the pieces of unit data converted from the second data to the memory device through the second queue area.

The memory device may include a first non-volatile memory and a second non-volatile memory, wherein some of the pieces of unit data converted from the first data are transmitted to the second non-volatile memory through the first queue area, and the remaining pieces of the unit data are transmitted to the first non-volatile memory through the second queue area The method may further include: sending a first request for re-classification of the first process from a non-critical process to a critical process from the kernel area through a system call interface in an application area that defines the host; and, re-classifying the first process as a critical process in response to the first request and storing first re-classification information about the first request.

The method may further include: after all of the pieces of unit data converted from the first data have been transmitted, sending a second request for re-classification of the first process from a critical process to a non-critical process from the kernel area through the system call interface in the application area; re-classifying the first process as a non-critical process in response to the second request; and, storing second re-classification information about the second request.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
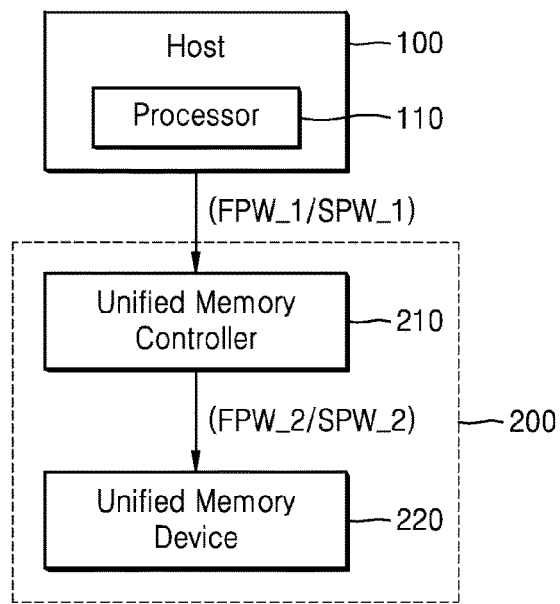
FIG. 1 is a block diagram illustrating a data processing system including a memory system according to an embodiment of the inventive concept.

Hereinafter, embodiments of the inventive concept will be described with reference to the accompanying drawings. The inventive concept may, however, be embodied in many different forms and should not be construed as being limited to the embodiments set forth herein; rather, these embodiments are provided so that this disclosure will be thorough and complete, and will fully convey the inventive concept to those of ordinary skill in the art. It should be understood, however, that there is no intent to limit the inventive concept to the particular forms disclosed, but on the contrary, the inventive concept is to cover all modifications, equivalents, and alternatives falling within the spirit and scope of the inventive concept. Like reference numerals denote like elements throughout the specification and drawings. In the drawings, the dimensions of structures are exaggerated or reduced for clarity of the inventive concept.

The terminology used herein is for the purpose of describing particular embodiments only and is not intended to be limiting of the inventive concept. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

Though terms like "first" and "second" are used to describe various elements, the elements are not limited to these terms. These terms are used only to differentiate one element from another. Therefore, a first element may be referred to as a second element, and similarly, a second element may be referred to as a first element, without departing from the scope of the inventive concept.

Unless otherwise defined, all terms used herein, including technical and scientific terms, have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a data processing system 10 including a memory system 200 according to an embodiment of the inventive concept.

Referring to FIG. 1, the data processing system 10 may include a host 100 and the memory system 200. Any system that processes data may include the memory system 200 illustrated in FIG. 1. Such a system may be, for example, a mobile device, such as a smartphone or a tablet device. The host 100 may include a processor 110. In some embodiments, the host 100 may include a system-on-chip processor that is included in a mobile device. In some embodiments, the host 100 may include a central processing unit (CPU) included in a computer system. The processor 110 may include various Internet protocols (IP), such as an external memory device driver (not shown) for controlling the memory system 200. The host 100 may communicate with the memory system 200 to transmit a command on a memory operation and receive a corresponding confirmation through a memory device driver.

The memory system 200 may include a unified memory controller 210 and a unified memory device 220. The unified memory controller 210, to perform an application in the memory system 200, receives a command on a memory operation for performing an application transmitted by the host 100, and generates an internal command and an internal clock signal by using the command and provides the internal command and the internal clock signal to the unified memory device 220. The performing of an application refers to performing processes existing in an application. To perform processes, the unified memory device 220 responds to the internal command and stores data related to processes, or responds to the internal command and provides read data to the unified memory controller 210. The unified memory device 220 may include a storage including a volatile memory and a non-volatile memory. For example, the volatile memory is a main memory, and a write operation may be performed on the volatile memory by using data for performing a process that the host 100 requests.

Data written to the volatile memory may be written to a non-volatile memory. The volatile memory may be, for example, a dynamic random access memory (DRAM). When power is turned off, in the case of the volatile memory, data may be erased, whereas in the case of the non-volatile memory, data may be stored without being erased. The non-volatile memory may include a first non-volatile memory and a second non-volatile memory which are distinguished from each other according to a data input and output performance. Hereinafter, for discussion, it is assumed the first non-volatile memory has better data input and output performance than the second non-volatile memory, and in an embodiment, a write operation to the first non-volatile memory may be faster than a write operation to the second non-volatile memory. However, the inventive concept is not limited to this embodiment. In an embodiment, the second non-volatile memory may have better data input and output performance than the first non-volatile memory, and the unified memory device 220 may further include other non-volatile memories including third and fourth non-volatile memories.

In an embodiment, a command for performing a first or second write operation of data for performing a process may be transmitted between the host 100 and the memory system 200. In an embodiment, an application may include a plurality of processes, and the application may be executed by performing the processes, and a write operation may vary according to a process. The first write operation may be a write operation of data for performing a process to the first non-volatile memory of the unified memory device 220. The second write operation may be a write operation of data for performing a process to the second non-volatile memory of the unified memory device 220. A write operation or reading operation of data for performing a process may be performed on a volatile memory of the unified memory device 220, and the first and second write operation may be performed synchronously or non-synchronously together with the write and read operations. The first write operation is an operation in which data stored in the volatile memory is written in the first non-volatile memory, and the second write operation is an operation in which data is written to the second non-volatile memory. As described above, since it is assumed that the first non-volatile memory has better data input and output performance than the second non-volatile memory, the first write operation may be performed faster than the second write operation. Accordingly, the first write operation is called a fastpath write operation FPW, and the second write operation is called a slowpath write operation SPW.

The host 100 determines which operation is to be performed to write data for performing a process operation from among the first write operation and the second write operation, and may provide a corresponding write operation command to the memory system 200. For example, according to a command provided to perform a process, any one selected from the first write operation and the second write operation may be selected. When the host 100 selects a fastpath write operation for data for performing a process, the host 100 may provide a first fastpath write signal FPW_1 to the unified memory controller 210. In response to the first fastpath write signal FPW_1, the unified memory controller 210 provides a second fastpath write signal FPW_2 to the unified memory device 220. In this regard, data for performing a process that has been stored in the volatile memory of the unified memory device 220 may be stored in the first non-volatile memory. To perform a fastpath write operation FPW, the host 100 provides the first fastpath write signal FPW_1 to the memory system 200, and in the memory system 200, the unified memory controller 210 may provide a second fastpath write signal FPW_2 to the unified memory device 220.

When the host 100 selects a slowpath write operation of data for performing a process, the host 110 may provide a first slowpath write signal SPW_1 to the unified memory controller 210, and in response to the first slowpath write signal SPW_1, the unified memory controller 210 may provide a second slowpath write signal (SPW_2) to the unified memory device 220. In this regard, data for performing a process that has been stored in the volatile memory of the unified memory device 220 may be stored in the second non-volatile memory.

To perform a slowpath write operation SPW, the host 100 may provide the first slowpath write signal SPW_1 to the memory system 200, and in the memory system 200, the unified memory controller 210 may provide a second slowpath write signal (SPW_2) to the unified memory device 220. In an embodiment, the fastpath write operation FPW and the slowpath write operation SPW may be performed simultaneously with a write operation of data for performing a process on a volatile memory. In some embodiments, the unified memory controller 210 may include a volatile memory that stores a command transmitted by the host 100, and such a volatile memory may be DRAM or a static random access memory (SRAM). Processes are classified according to process information that may include process characteristics. For example, processes may be classified according to a command for performing a process. According to the classification results, a write operation of data for performing a process is determined By doing this, performance of a data processing system may be improved.

However, embodiments are not limited to this embodiment. For example, the inventive concept may also be applied to data for performing a thread other than a process. However, for convenience of description, embodiments will be described herein based on a process.

Figure 2:
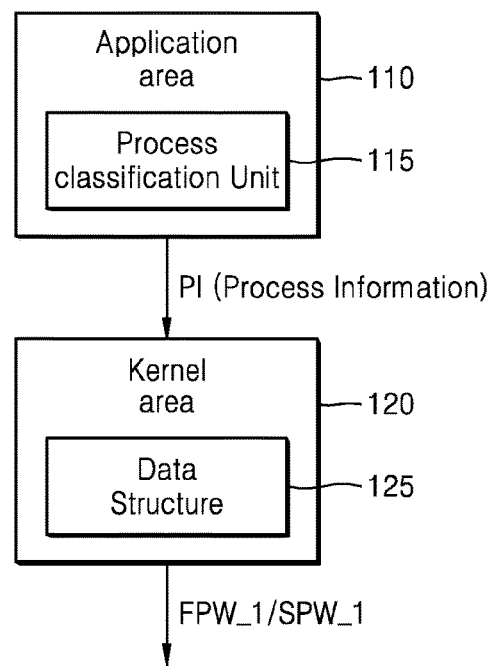
FIG. 2 is a block diagram illustrating an embodiment of a host shown in FIG. 1 implemented as software.

FIG. 2 shows a block diagram of an example of the host 100 shown in FIG. 1 implemented as software.

Referring to FIG. 2, the host 100 may further include a processor (not shown), and when implemented as a software configuration, to perform an application, the host 100 may include an application area 110 and a kernel area 120. An application may include a plurality of processes, and the application may be executed by performing the processes. The application area 110 may collect and store process information (PI) including information about the role of each process, information about a process performance sequence, and information about whether a file synchronization function is called when a process is performed, and may provide the PI to the kernel area 120.

In some embodiments, the PI may include information about whether a process is a critical process or a non-critical process. The critical process is defined as follows: when a process is performed, in an embodiment, an application calls a file synchronization function (e.g. Linux fsync) to allow data for performing a process to be written to a main memory, and synchronously, until all or some of the data are written to a non-volatile memory, performing of other processes is stopped. The other process that is not the critical process may be called a non-critical process. The non-critical process is defined as follows: unlike the critical process, without the calling of the file synchronization function (e.g. Linux fsync), data for performing a process is allowed to be written to the main memory, and in an embodiment, when other processes are not performed, non-synchronously, all or some of the data may be written to and stored in a non-volatile memory. The application area 110 may include a process classification unit 115, and the process classification unit 115 classifies a currently-performing process as a critical process or a non-critical process, and based on the classification result, the process classification unit 115 generates PI, and provides the PI to the kernel area 120. In some embodiments, the application area 110 may provide PI to the kernel area 120 through a system call interface.

The kernel area 120 is a virtual space in which a plurality of processes are performed to execute an application, and may include a data structure 125 for managing a currently-performing process. The data structure 125 may store PI that is transmitted by the application area 110. In some embodiments, when the kernel area 120 receives PI indicating that a currently-performing process is a critical process, the data structure 125 may store the PI indicating that the currently-performing process is a critical process. To perform a fastpath write operation FPW of data for performing the critical process to the unified memory device UMD, the first fastpath write signal FPW_1 may be provided to the unified memory controller UMC. In some embodiments, when the kernel area 120 receives PI indicating that a currently-performing process is a non-critical process, the data structure 125 may store PI indicating that the currently-performing process is a non-critical process. In this regard, to perform a slowpath write operation (FPW) of data for performing the non-critical process to the unified memory device UMD, the first slowpath write signal SPW_1 may be provided to the unified memory controller UMC.

Figure 3:
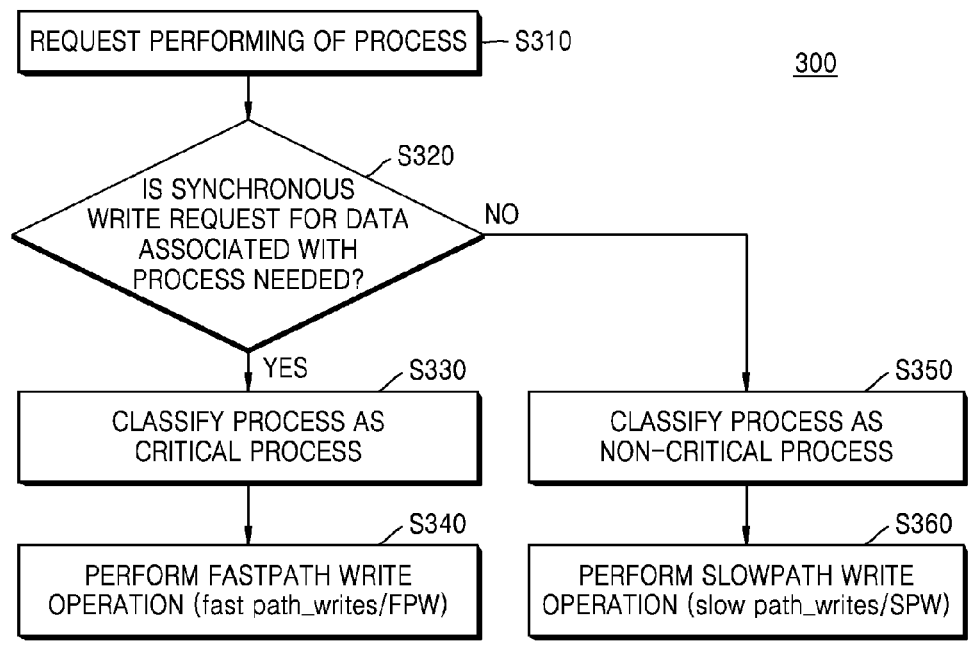
FIG. 3 is a flowchart illustrating a method of operating a data processing system according to an embodiment of the inventive concept.

FIG. 3 shows a flowchart illustrating a method 300 of operating a data processing system according to an embodiment of the inventive concept. The flowchart of FIG. 3 shows an example of a method of operating a data processing system to explain performing of a fast or slow write operation.

Referring to FIG. 3, a host or a processor may request performing of a plurality of processes to execute an application (S310). An application area may collect and store information about a currently-performing process, and may include information about whether the process is a critical process or a non-critical process. In this regard, criteria for classifying the process as a critical process may be whether a synchronous write request of data for performing a process is needed, which may be determined by the application area (S320). The synchronous write request may be defined as follows: when a process is performed, in an embodiment, an application may call a file synchronization function (e.g. Linux fsync) to allow data for performing a process to be written to a main memory, and synchronously, all or some of the data are requested to be written to a non-volatile memory.

In the case in which the synchronous write request is needed, a corresponding process is classified as a critical process (S330). The application area may provide PI indicating that the synchronous write request is needed to a kernel area. Thereafter, the kernel area stores the PI in a data structure, and based on the IP may provide a signal for fastpath write operation (fast path_writes/FPW) to a memory system. In response, the memory system performs a fastpath write operation FPW (S340). In the case in which the synchronous write request is not needed, a corresponding process is classified as a non-critical process (S350). The application area may provide PI indicating that the synchronous write request is not needed to a kernel area. Thereafter, the kernel area stores the PI in a data structure, and based on the IP, may provide a signal for slowpath write operation (slow path_writes/SPW) to a memory system. In response, the memory system performs a slowpath write operation SPW (S360). A write operation will be described in detail later.

Figure 4:
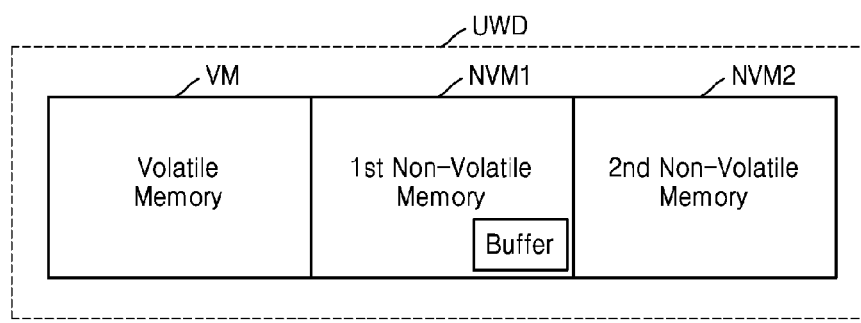
FIG. 4 is a block diagram illustrating a unified memory device UMD according to an embodiment of the inventive concept.

FIG. 4 shows a block diagram of a unified memory device UMD according to an embodiment of the inventive concept.

Referring to FIG. 4, a unified memory device UMD includes a volatile memory (VM), a first non-volatile memory NVM1, and a second non-volatile memory NVM2. The volatile memory VM acts as a main memory, and may be a DRAM. The first non-volatile memory NVM1 is a storage class memory, and may include at least one selected from a resistance random access memory (RRAM), a phase change random access memory (PRAM), a magnetic random access memory (MRAM), STT-MRAM, and a ferroelectric random access memory (FRAM). The first non-volatile memory NVM1 is where data for performing a process is written during a fastpath write operation FPW. In some embodiments, the first non-volatile memory NVM1 may include a buffer in which data for performing a process is written during a fastpath write operation FPW.

The second non-volatile memory NVM2 may include at least one selected from a NAND flash memory, a NOR flash memory, and a hard disk. The second non-volatile memory NVM2 is where data for performing a process is written during a slowpath write operation SPW. In some embodiments, data that has been written to a buffer may be written to a second non-volatile memory NVM2, when a process has been completely performed and performing of other processes is not needed, that is, during an idle status period in which performing of other processes is not requested. In some embodiments, when the second non-volatile memory NVM2 includes a NAND flash memory, a cell array (not shown) included in the second non-volatile memory NVM2 may include a plurality of blocks and pages, and programming and reading of data may be performed in a unit of page, whereas erasing of data may be performed in a unit of block.

The first non-volatile memory NVM1 may have higher data input and output operation performance than the second non-volatile memory NVM2. In some embodiments, an amount of time that lapses when data is written to the first non-volatile memory NVM1 may be smaller than an amount of time that lapses when data is written to the second non-volatile memory NVM2. The first non-volatile memory NVM1 and the second non-volatile memory NVM2 may have different data storage capacities. For example, the second non-volatile memory NVM2 may have a greater data storage capacity than the first non-volatile memory NVM1. By using data non-volatility and high input and output operation performance of the first non-volatile memory NVM1, data input and output performance may be increased while energy efficiency is increased or optimized.

Figure 5A:
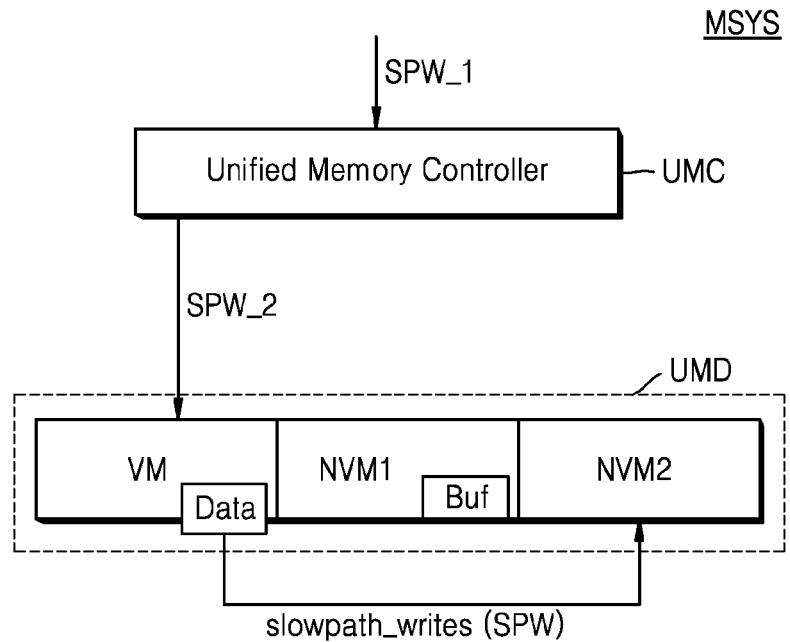
FIG. 5A is a block diagram illustrating a memory system performing a slowpath write operation SPW according to an embodiment of the inventive concept.

FIG. 5A shows a block diagram of a memory system performing a slowpath write operation SPW according to an embodiment of the inventive concept.

Referring to FIG. 5A, a memory system may include a unified memory controller UMC and a unified memory device UMD, and the unified memory device UMD may have the configuration illustrated in FIG. 4. The unified memory controller UMC may receive a first slowpath write signal SPW_1 from the outside. As described in connection with FIG. 3, when a currently-performing process is classified as a non-critical process, a slowpath write operation SPW may be performed. Accordingly, a kernel area implemented as software of a host or a processor included in the host may provide the first slowpath write signal SPW_1 to the unified memory controller UMC so as to write data Data for performing a process to the unified memory device UMD.

The unified memory controller UMC may provide, based on the first slowpath write signal SPW_1, a second slowpath write signal SPW_2 to the unified memory device UMD, to write data Data for performing a process which has been stored in a volatile memory VM to the second non-volatile memory NVM2. In some embodiments, all of data Data for performing a process stored in the volatile memory VM or only some of the data Data that has been modified by the performing of the process, may be written to the second non-volatile memory NVM2.

Figure 5B:
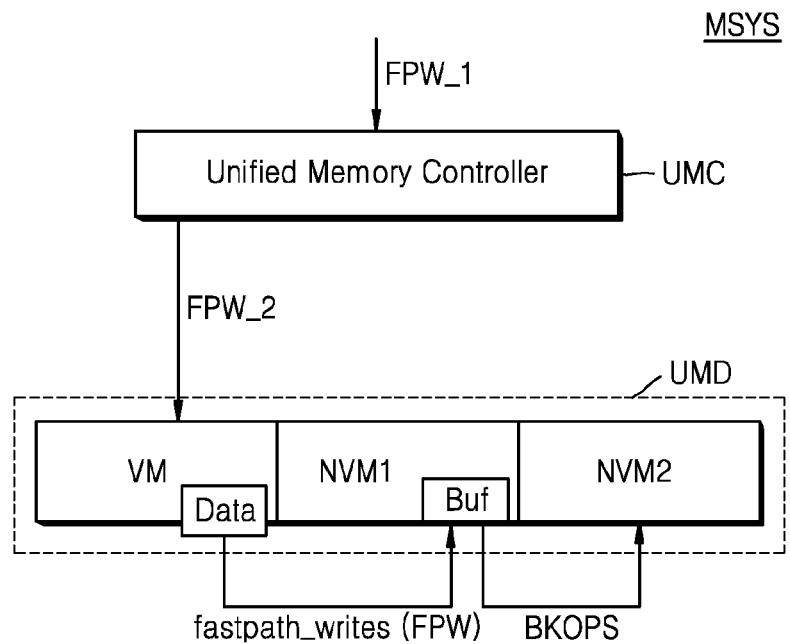
FIG. 5B is a block diagram illustrating a memory system performing a fastpath write operation FPW according to an embodiment of the inventive concept.

FIG. 5B shows a block diagram of a memory system performing a fastpath write operation FPW according to an embodiment of the inventive concept.

Referring to FIG. 5B, a memory system MSYS may include a unified memory controller UMC and a unified memory device UMD. The unified memory controller UMC may receive a first fastpath write signal FPW_1 from the outside. As described in connection with FIG. 3, when a currently-performing process is classified as a critical process, a fastpath write operation FPW may be performed. Accordingly, a kernel area implemented as software of a host or a processor included in the host may provide the first fastpath write signal FPW_1 to the unified memory controller UMC so as to write data Data for performing a process to the unified memory device UMD.

The unified memory controller UMC may provide, based on the first fastpath write signal FPW_1, a second fastpath write signal FPW_2 to the unified memory device UMD, to write data Data for performing a process which has been stored in a volatile memory VM to the first non-volatile memory NVM1. In some embodiments, the first non-volatile memory NVM1 may include a buffer Buf having a storage space, and by the fastpath write operation FPW, the data Data may be written to and stored in the buffer Buf. In some embodiments, all of data Data for performing a process stored in the volatile memory VM or only some of the data Data that has been modified by the performing of the process, may be written to the buffer Buf. In some embodiments, thereafter, when a process has been completely performed and other processes are not performed, a backup operation BKOPS in which data Data stored in the buffer Buf is written and stored in the second non-volatile memory NVM2 may be performed. However, the backup operation (BKOPS) is not limited to the present embodiment.

Figure 6A:
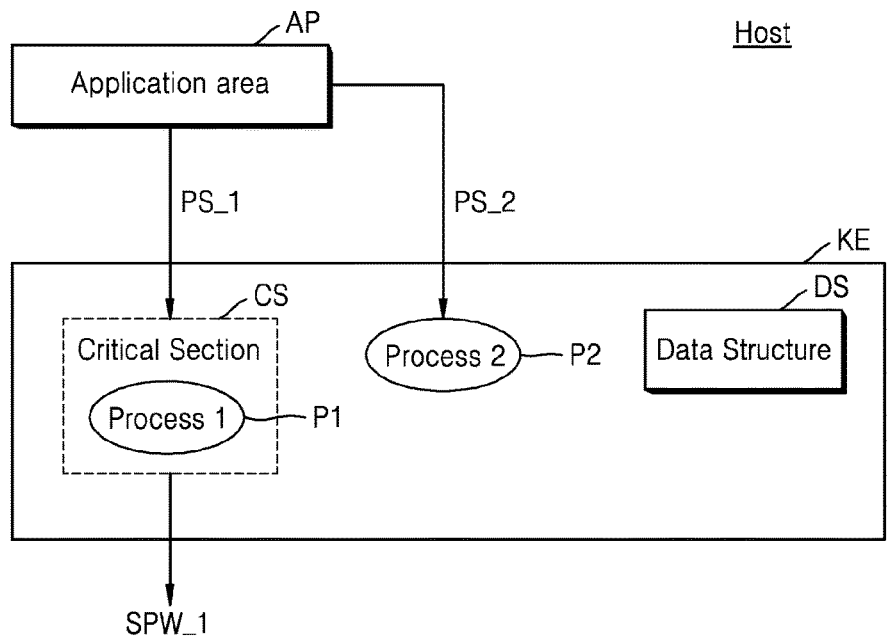
FIGS. 6A, 6B, and 6C are block diagrams illustrating a host implemented as software and a critical process re-classification operation according to an embodiment of the inventive concept.
Figure 6B:
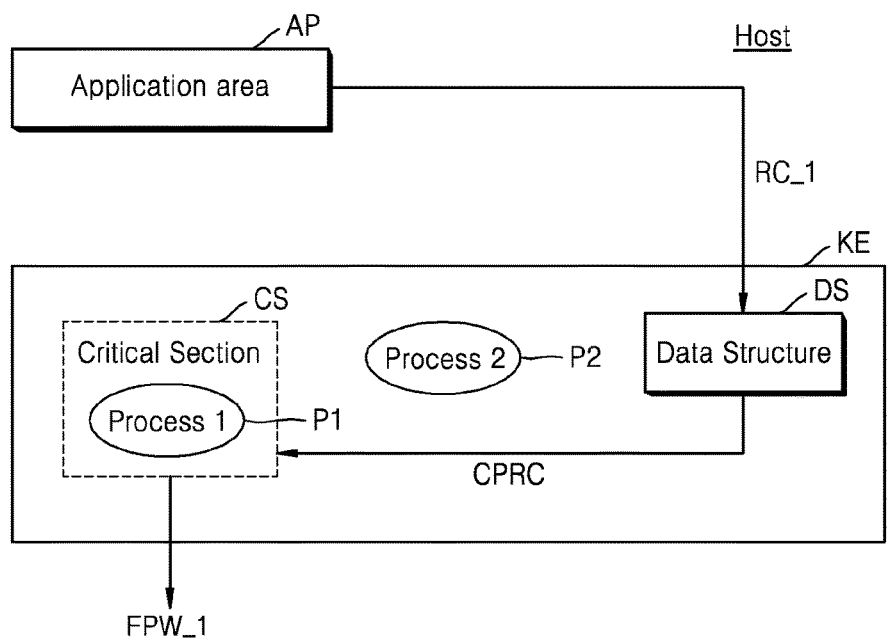
Figure 6C:
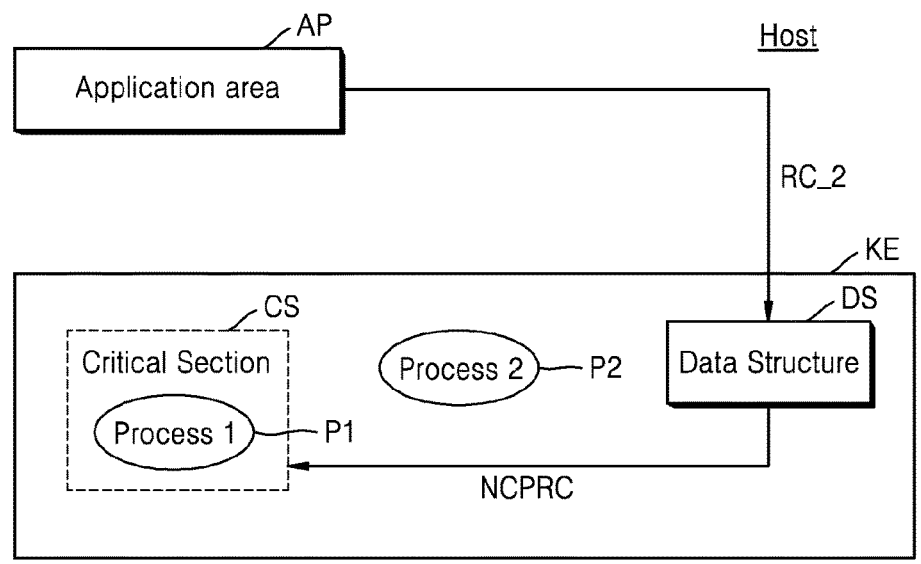

FIGS. 6A, 6B, and 6C show block diagrams of a host Host implemented as software performing a critical process re-classification process according to an embodiment of the inventive concept.

Referring to FIG. 6A, executing of an application needs performance of a first process P1 and a second process P2, and the application area AP may provide a first process signal PS_1 to the kernel area KE so that a critical section CS is formed in the first process P1 that is performed first. In the case in which the critical section CS is formed in the first process P1, when the first process P1 has been completely performed, the second process P2 may be performed. The first process signal PS_1 may include information about the first process P1, and a second process signal PS_2 may include information about the second process P2. The application area AP may provide information indicating that the first process P1 is classified as a non-critical process and the second process P2 is classified as a critical process to the kernel area KE. The information may be recorded and stored in the data structure DS. In some embodiments, the first process signal PS_1 and the second process signal PS_2 may be included in a single process signal. The first process P1 is classified as a non-critical process, and the kernel area KE may provide the first slowpath write signal SPW_1 to a memory system MSYS. In this regard, a slowpath write operation SPW may be performed in the first process P1, delaying the performance of the second process P2 which is classified as a critical process. Accordingly, there may be a need to re-classify the first process P1 as a critical process.

Referring to FIG. 6B, as described in connection with FIG. 6A, in the case that the first process P1 is classified as a non-critical process and a critical section CS is formed about the first process P1, and the second process P2 is classified as a critical process and it is waiting for the first process P1 to be completely performed, the application area AP may provide a re-classification signal RC_1 to the kernel area KE. The kernel area KE receives a first re-classification signal RC_1 and records and stores in the data structure DS information indicating that the first process P1 is re-classified from a non-critical process to a critical process. Thereafter, the data structure DS, based on the re-classification information, may generate a critical process re-classification signal CPRC to re-classify the first process P1 as a critical process. The first process P1 may be re-classified as a critical process, and the kernel area KE may provide a first fastpath write signal FPW_1 to the memory system so as to perform a fastpath write operation FPW of data for performing the first process P1.

Referring to FIG. 6C, when the first process P1 has been completely performed, the application area AP may provide a second re-classification signal RC_2 to the kernel area KE. The kernel area KE receives the second re-classification signal RC_2 and records and stores in the data structure DS information indicating that the first process P1 is re-classified from a critical process to a non-critical process. Thereafter, the data structure DS, based on the re-classification information, may generate a non-critical process re-classification signal NCPRC to re-classify the first process P1 as a non-critical process. The first process P1 may be re-classified as a non-critical process. Thereafter, the second process P2 may be performed. However, the inventive concept is not limited to the present embodiment. For example, a processor included in a host may perform the above-described operation of the host Host.

Figure 7:
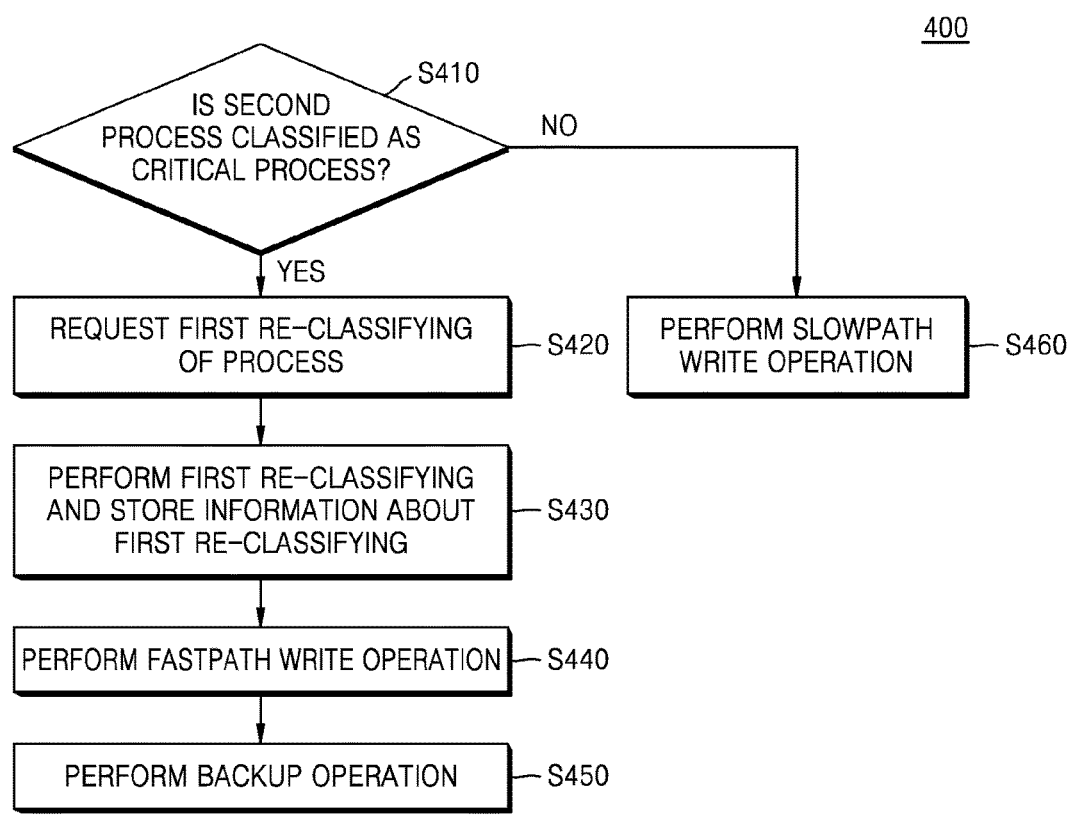
FIG. 7 is a flowchart illustrating a method of operating a data processing system according to an embodiment of the inventive concept.

FIG. 7 shows a flowchart illustrating a method 400 of operating a data processing system according to an embodiment of the inventive concept. Referring to FIG. 7, an example of re-classification as a critical process when two or more processes need to be performed is described.

Referring to FIGS. 7, 6A, 6B, and 6C, the application area AP classifies the first process P1 as a non-critical process, a critical section is formed about the first process P1, and when the first process P1 has been completely performed, the second process P2 may be performed. In this regard, it is determined whether the second process P2 is classified as a critical process (S410). The determining that the second process P2 is classified as a critical process may be done by the application area AP, based on process information stored in the data structure DS included in the kernel area KE.

When the second process P2 is classified as a critical process, the application area AP provides a first re-classification signal RC_1 for the first process P1 to the kernel area KE to request a first re-classification (S420). In response to the first re-classification signal RC_1, a first re-classification operation may be performed in which the first process P1 is re-classified from a non-critical process to a critical process, and first re-classification information about first process P1 may be stored in the data structure DS of the kernel area KE (S430). The first process P1 is re-classified as a critical process, and thus, data for performing the first process P1 may be written to the unified memory device by a fastpath write operation FPW (S440). The fastpath write operation FPW has already been described in connection with FIG. 5B. In the case in which the fastpath write operation FPW has been completely performed and in an embodiment, other processes are not performed, as described in connection with FIG. 5B, the backup operation (BKOPS) may be performed (S450).

When the second process P2 is classified as a non-critical process, the memory system may perform a slowpath write operation SPW (S460). In some embodiments, however, even when the second process P2 is classified as a non-critical process, in some cases, a fastpath write operation FPW may be performed.

Figure 8:
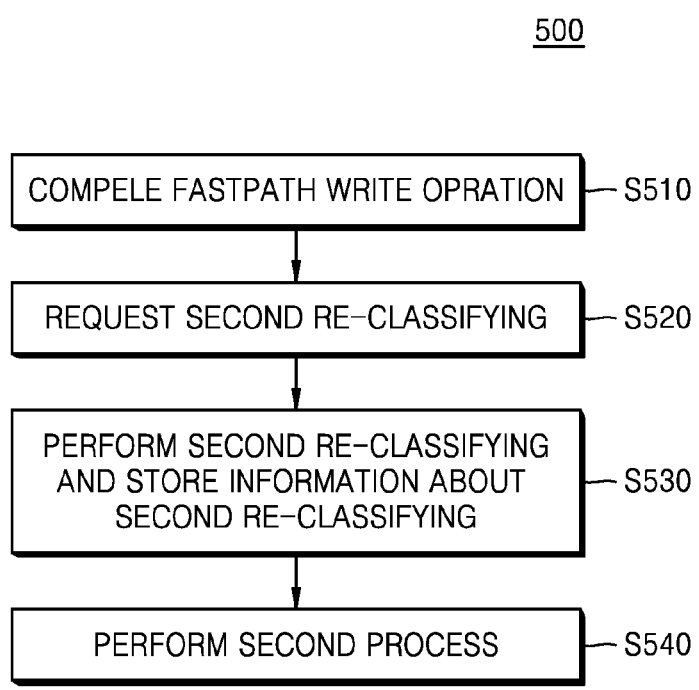
FIG. 8 is a flowchart illustrating a method of operating a data processing system according to an embodiment of the inventive concept.

FIG. 8 shows a flowchart illustrating a method 500 of operating a data processing system according to an embodiment of the inventive concept. The flowchart of FIG. 8 is used to explain an operation after the fastpath write operation FPW illustrated in FIG. 7 has been completely performed.

Referring to FIG. 8, in the case in which the fastpath write operation FPW has been completely performed (S510), to re-classify the first process P1 from a non-critical process to a critical process, the application area AP provides a second re-classification signal RC_2 to the kernel area KE so as to request a second re-classification (S520). In response to the second re-classification signal RC_2, a second re-classification operation in which the first process P1 is re-classified from a critical process to a non-critical process may be performed, and second re-classification information about the first process P1 may be stored in the data structure DS of the kernel area KE (S530). Thereafter, the second process P2 may be performed (S540). In this regard, the application area AP may form the critical section CS that has been formed about the first process P1 in the second process P2. Data for performing the second process P2 that is classified as a critical process may be written by a fastpath write operation FPW.

Figure 9A:
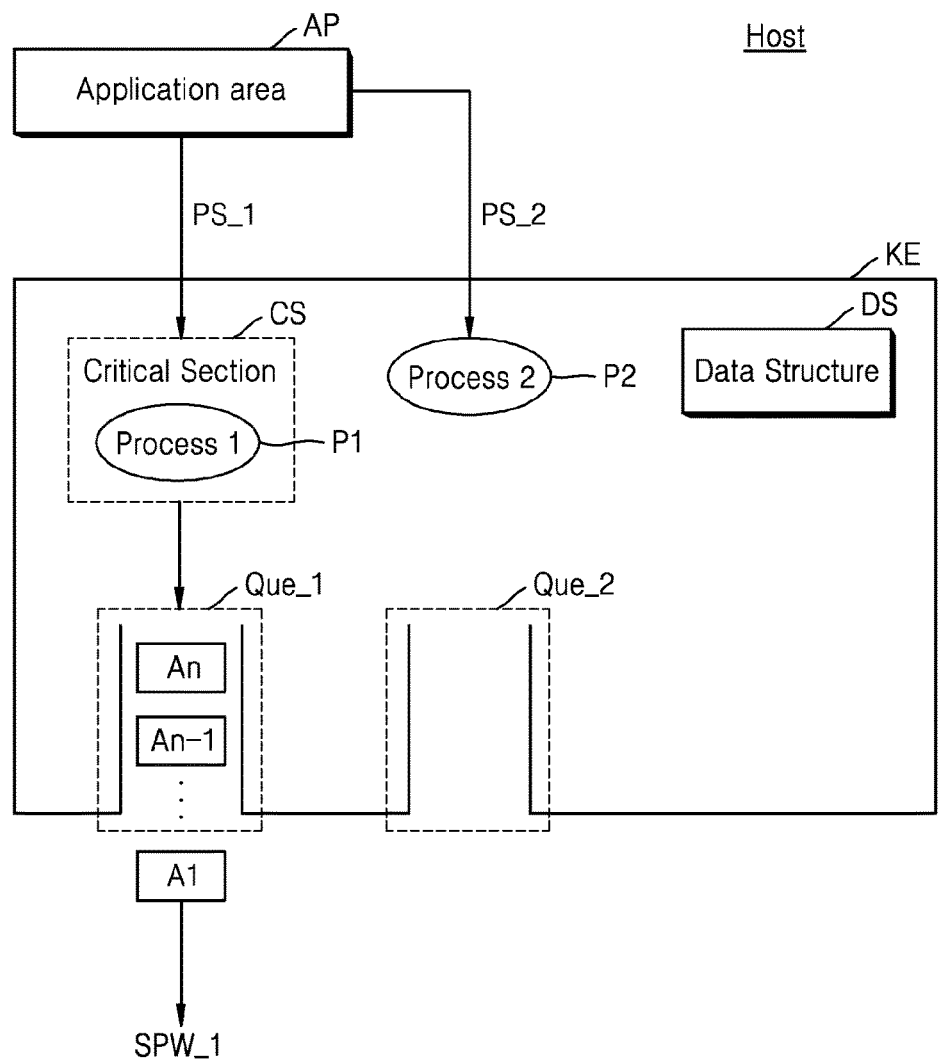
FIGS. 9A, 9B, and 9C are block diagrams of a host implemented as software and a critical process dynamic re-classification operation according to an embodiment of the inventive concept.
Figure 9B:
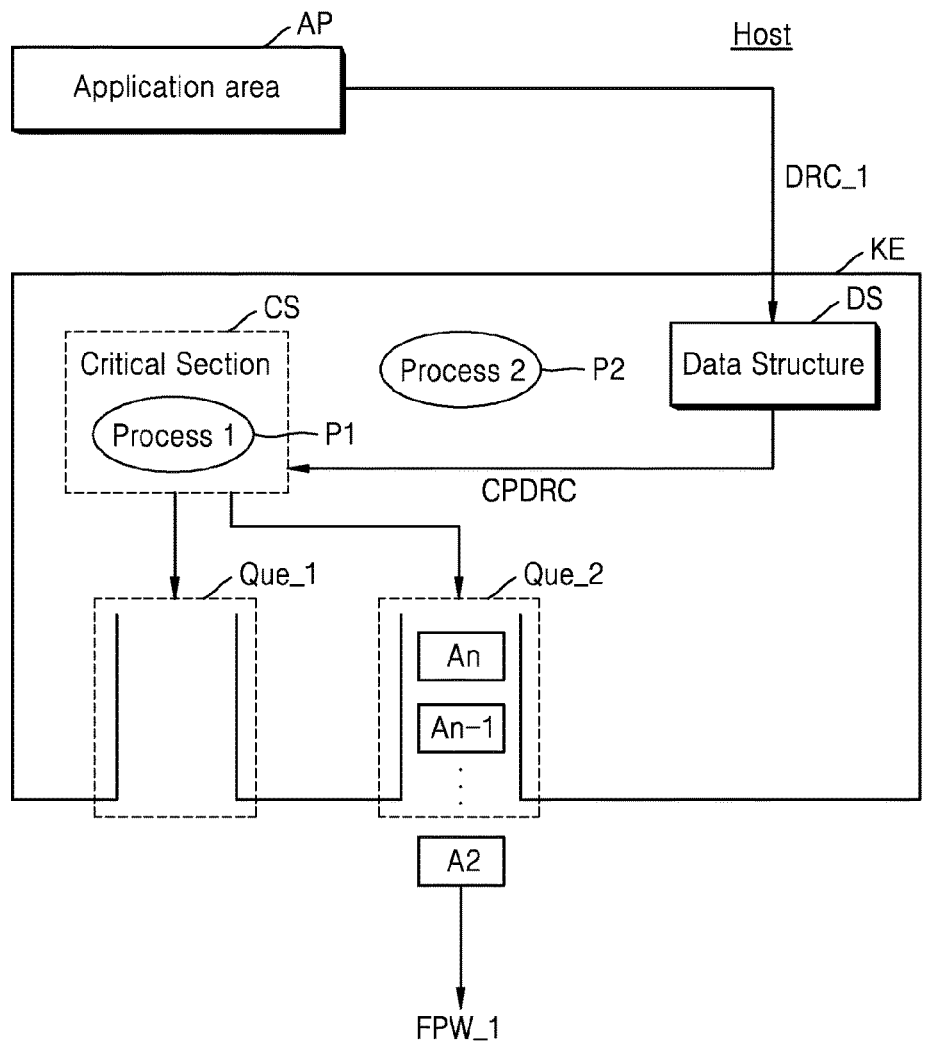
Figure 9C:
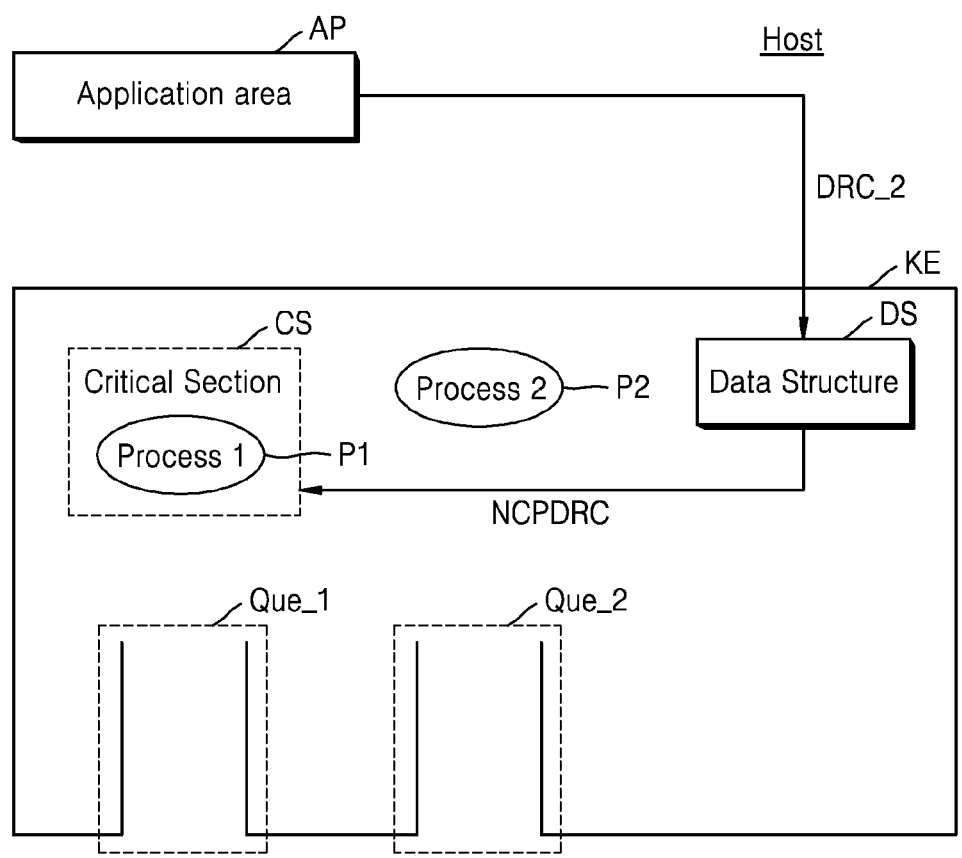

FIGS. 9A, 9B, and 9C show block diagrams of a host Host implemented as software performing a critical process dynamic re-classification operation according to an embodiment of the inventive concept.

Referring to FIG. 9A, the configuration of FIG. 6A may further include a first queue area Que_1 and a second queue area Que_2. The first queue area Que_1 may be where data segments obtained by dividing data for performing the first process P1 stand by to be sequentially provided to a memory system including the unified memory device UMD during a slowpath writing. The first process P1 may be classified as a non-critical process, and thus, data for performing the first process P1 may be divided into a plurality of data segments A1 through An, and the first data segment A1 may be provided from the first queue area Que_1 to the memory system. The first data segment A1 may be provided together with the first slowpath write signal SPW_1 to perform a slowpath write operation SPW in the memory system.

The other data segments A2 through An may stand by in the first queue area Que_1. However, embodiments are not limited thereto. In some embodiments, at least one data segment may be provided from the first queue area Que_1 to the memory system. As described above, at least one of data segments obtained by dividing data for performing the first process P1 is provided to the memory system, and then, the second process P2 is to be performed. Hereinafter, a dynamic re-classification operation in which the first process P1 is classified as a critical process in response to the second process signal PS_2 will be described.

Referring to FIG. 9B, as explained in connection with FIG. 9A, at least one of data segments obtained by dividing data for performing the first process P1 is provided to the memory system, and then, the second process P2 is to be performed, and when the first process P1 is classified as a critical process in response to the second process signal PS_2, the application area AP may provide a first dynamic re-classification signal DRC_1 to the kernel area KE. The kernel area KE receives the first dynamic re-classification signal DRC_1 and records and stores in the data structure DS information about the first process P1 being re-classified from a non-critical process to a critical process. Thereafter, the data structure DS, based on the re-classification information, may generate a critical process dynamic re-classification signal CPDRC to re-classify the first process P1 as a critical process. The kernel area KE, to perform a fastpath write operation FPW of the data segments A2 through An that remain in the first queue area Que_1 from among data for performing the first process P1, may move the data segments A2 through An to the second queue area Que_2 used for a fastpath write operation FPW. In some embodiments, the data segments A2 through An may be copied in the second queue area Que_2, and the data segments A2 through An standing by in the first queue area Que_1 may be deleted. Thereafter, the second data segment A2 and the other data segments A3 through An may be provided from the second queue area Que_2 to the memory system MSYS, and may be provided together with a first fastpath write signal FPW_1, and subjected to a fastpath write operation in the memory system.

Referring to FIG. 9C, when the first process P1 has been completely performed, that is, all the data segments A2 through An are provided through the second queue area Que_2, the application area AP may provide a second dynamic re-classification signal DRC_2 to the kernel area KE. The kernel area KE receives the second dynamic re-classification signal DRC_2 and records and stores in the data structure DS information indicating that the first process P1 is re-classified from a critical process to a non-critical process. Thereafter, the data structure DS, based on the re-classification information, may generate a non-critical process dynamic re-classification signal NCPDRC to re-classify the first process P1 as a non-critical process. The first process P1 may be re-classified as a non-critical process. Thereafter, the second process P2 may be performed.

However, the inventive concept is not limited to the present embodiment. For example, a processor included in a host Host may perform the above-described operation of the host Host.

Figure 10:
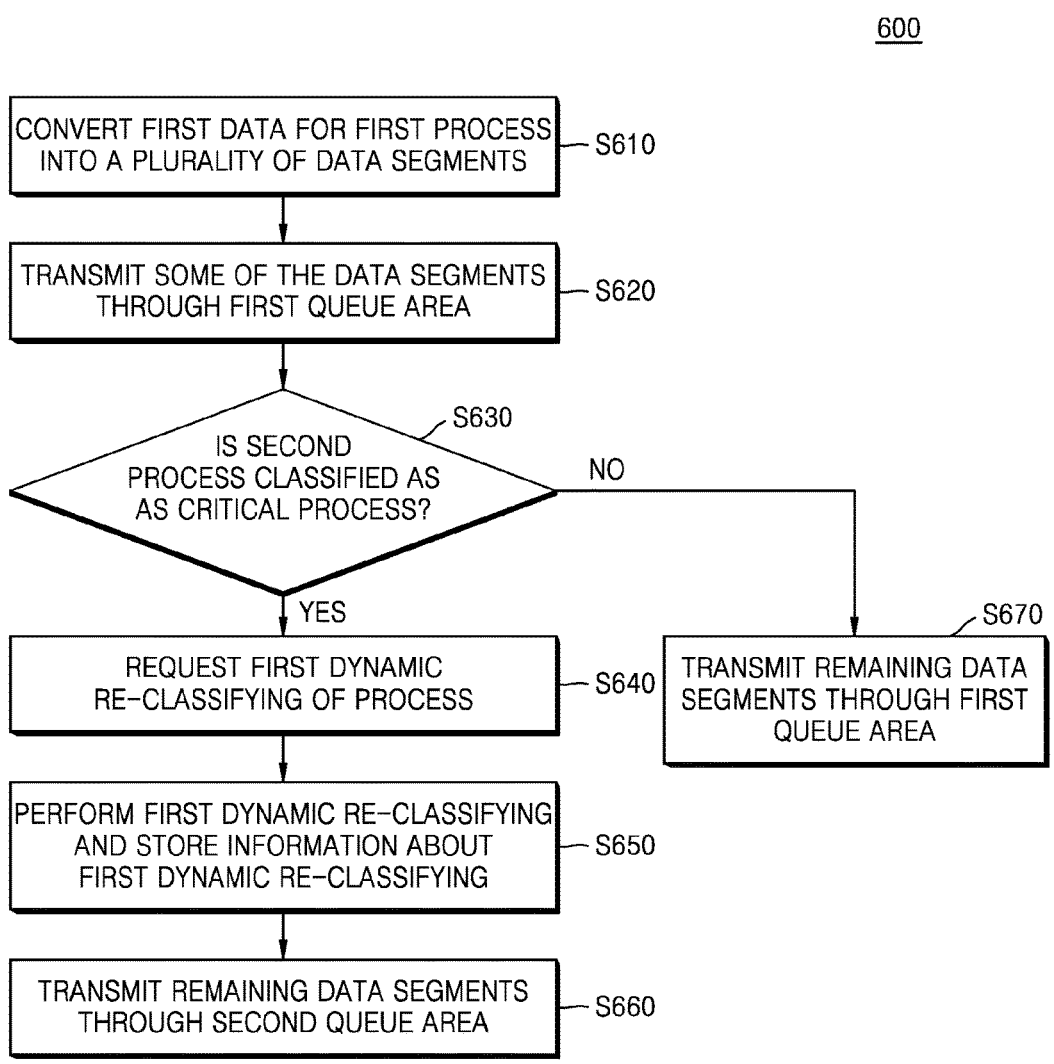
FIG. 10 is a flowchart illustrating a method of operating a data processing system according to an embodiment of the inventive concept.

FIG. 10 shows a flowchart illustrating a method 600 of operating a data processing system according to an embodiment of the inventive concept. The flowchart of FIG. 10 shows an example of dynamic re-classification as a critical process when two or more processes need to be performed.

Referring to FIGS. 10 and 9A, 9B, and 9C, the application area AP may convert first data for performing a first process P1 into a plurality of data segments (S610). The data segments may stand by in the first queue area Que_1 for a slowpath write operation SPW, and some of the data segments may be transmitted to the memory system through the first queue area Que_1 (S620). In this regard, a first slowpath write signal SPW_1 may also be provided together. Thereafter, the second process P2 is to be performed, and it may be determined that the second process P2 is classified as a critical process (S630). Whether the second process P2 is classified as a critical process may be determined by the application area AP, based on process information stored in the data structure DS of the kernel area KE.

When the second process P2 is classified as a critical process, the application area AP provides a first dynamic re-classification signal DRC_1 for the first process P1 to the kernel area KE to request a first re-classification (S640). In response to the first dynamic re-classification signal (DRC_1), a first dynamic re-classification operation may be performed in which the first process P1 is re-classified from a non-critical process to a critical process, and first dynamic re-classification information about the first process P1 may be stored in the data structure DS of the kernel area KE (S650). Thereafter, the remaining data segments that stand by in the first queue area Que_1 without being transmitted may be moved to the second queue area Que_2, and then transmitted to the memory system (S660). In this regard, the remaining data segments may be transmitted together with the first fastpath write signal FPW_1, and thus, a fastpath write operation FPW may be performed. However, when the second process P2 is classified as a non-critical process, the remaining data segments may be transmitted to the memory system through the first queue area Que_1 (S670). In some embodiments, even when the second process P2 is classified as a non-critical process, in some cases, the remaining data segments may be transmitted to the memory system through second queue area Que_2.

Figure 11:
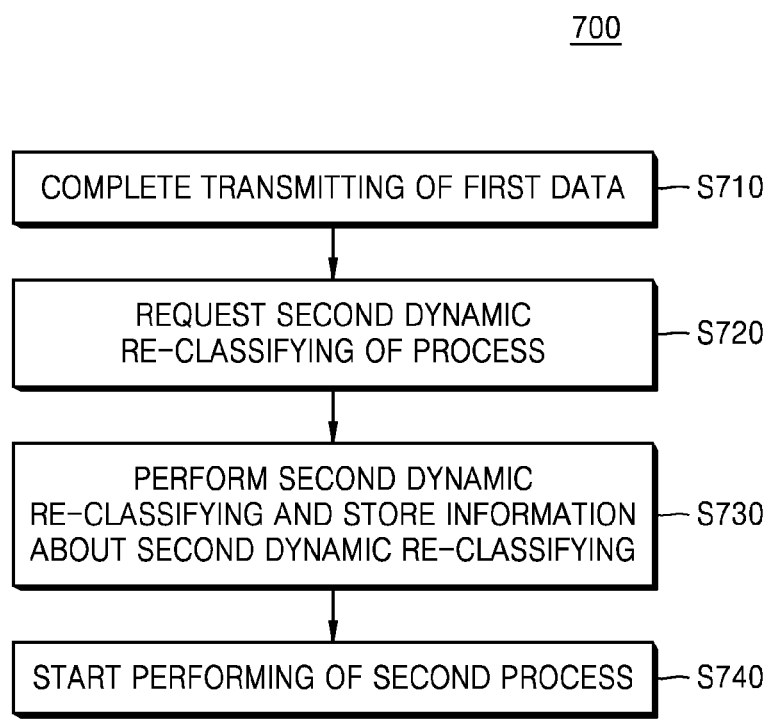
FIG. 11 is a flowchart illustrating a method of operating a data processing system according to an embodiment of the inventive concept.

FIG. 11 shows a flowchart illustrating a method 700 of operating a data processing system according to an embodiment of the inventive concept. The flowchart of FIG. 11 is used to explain an operation after first data for performing the first process P1 has been completely transmitted.

Referring to FIG. 11, when the first data has been completely transmitted (S710), to re-classify the first process P1 from a critical process to a non-critical process, the application area AP provides a second dynamic re-classification signal DRC_2 to the kernel area KE to request a second dynamic re-classification (S720). In response to the second dynamic re-classification signal DRC_2, a second dynamic re-classification operation in which the first process P1 is dynamically re-classified from a critical process to a non-critical process may be performed, and second dynamic re-classification information about the first process P1 may be stored in the data structure DS of the kernel area KE (S730). Subsequently, the second process P2 may be performed (S740). In this regard, the application area AP may form the critical section CS that has been formed about the first process P1 in the second process P2. Data for performing the second process P2 that is classified as a critical process may be written by a fastpath write operation FPW.

Figure 12:
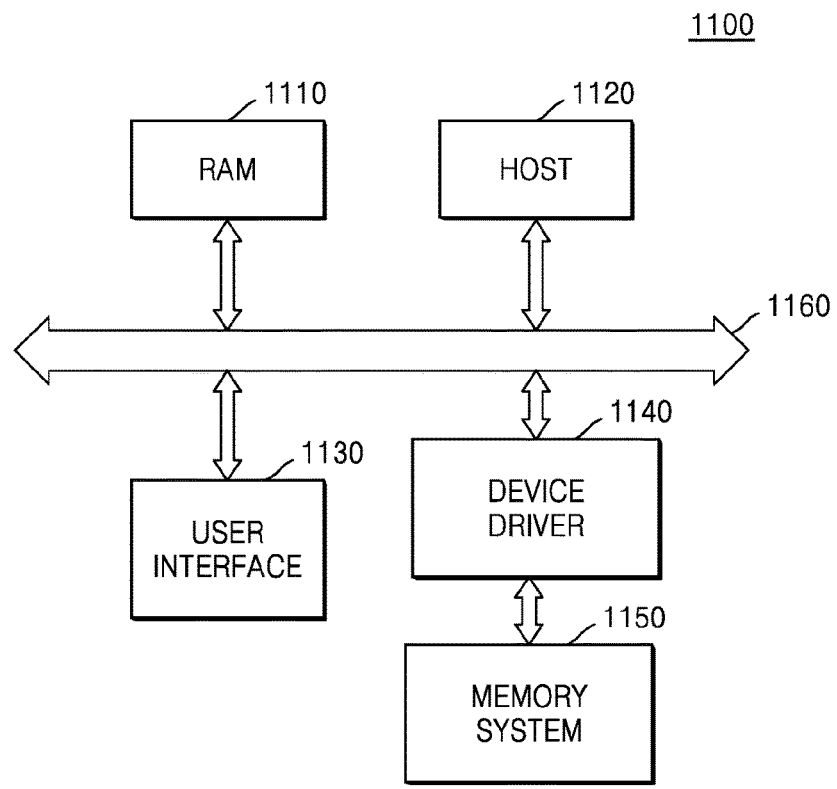
FIG. 12 is a block diagram of a computing system including a memory system according to an embodiment of the inventive concept.

FIG. 12 shows a block diagram of a computing system 1100 including a memory system 1150 according to an embodiment of the inventive concept. The computing system 1100 according to an embodiment of the inventive concept may be a mobile device or a desk top computer, and may include a host 1120 including, for example, CPU, a RAM 1110, a user interface 1130, and a device driver 1140, each of which is electrically connected to a bus 1160. The memory system 1150 according to an embodiment may be connected to the device driver 1140. The host 1120 may control the computing system 1100, and may perform a computing operation corresponding to a command input by a user through the user interface 1130. The RAM 1110 may act as a data memory for the host 1120, and the host 1120 may record or read user data in or from the memory system 1150 through the device driver 1140. Although in FIG. 12, the device driver 1140 for controlling the operation and management of the memory system 1150 is included outside the host 1120, in some embodiments, the device driver 1140 may be included inside the host 1120. The memory system 1150 may include the unified memory controller 210 and the unified memory device 220 illustrated in FIG. 1.

Figure 13:
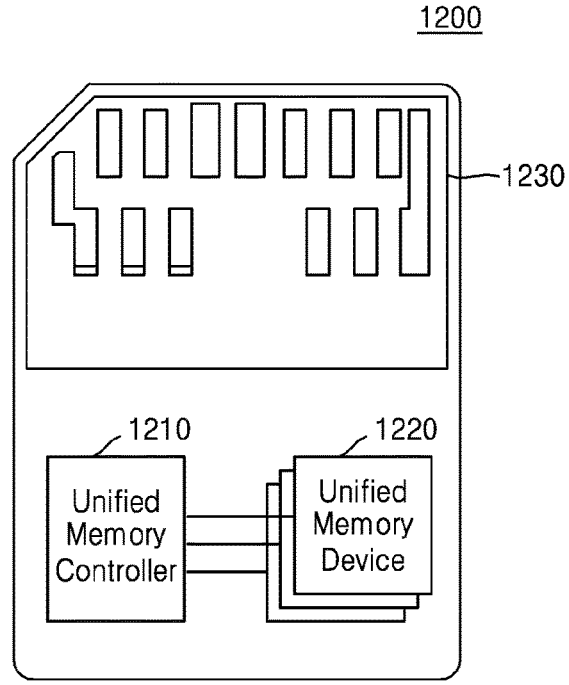
FIG. 13 is a schematic diagram illustrating a memory card according to an embodiment of the inventive concept.

FIG. 13 illustrates a view of a memory card 1200 according to an embodiment of the inventive concept. The memory card 1200 may be a potable storage device that is to be connected to an electronic device, such as a mobile device or a desktop computer. As illustrated in FIG. 1, the memory card 1200 includes a unified memory controller 1210, a unified memory device 1220, and a port area 1230. The memory card 1200 may communicate with an external host (not shown) through the port area 1230, and the unified memory controller 1210 may control the unified memory device 1220. The unified memory controller 1210 may read a program from ROM (not shown) that stores programs.

Figure 14:
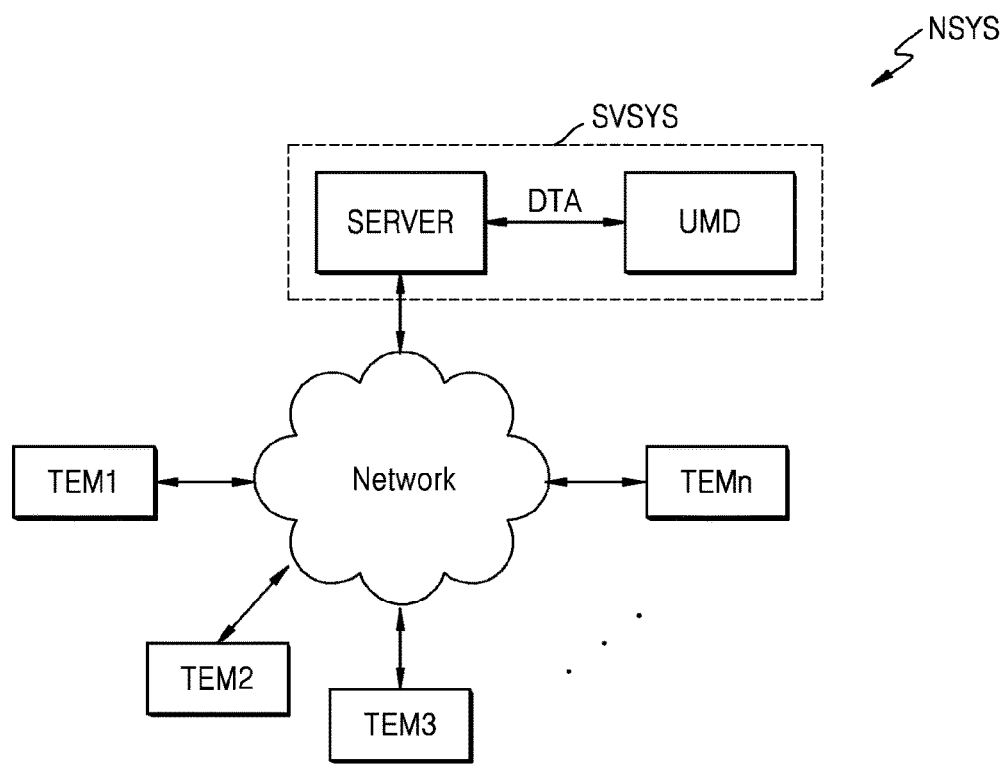
FIG. 14 is a schematic diagram illustrating a server system and a network system, each including a unified memory device UMD shown in FIG. 1.

FIG. 14 illustrates a view of a server system and a network system, each including a unified memory device UMD shown in FIG. 1. Referring to FIG. 14, the network system (NSYS) according to an embodiment may include a server system SVSYS and a plurality of terminals TEM1 through TEMn which are connected through a network. The server system SVSYS according to an embodiment may include a server SERVER that processes requests transmitted by the terminals TEM1 through TEMn connected through a network and a unified memory device UMD that stores data corresponding to requests transmitted by the terminals TEM1 through TEMn. Accordingly, the network system NSYS and the server system SVSYS reliably perform an authentication operation between a controller and a memory of the unified memory device UMD, providing system reliability.

While the inventive concept has been particularly shown and described with reference to exemplary embodiments thereof, it will be understood that various changes in form and details may be made therein without departing from the spirit and scope of the following claims.

What is claimed is:

1. A method of operating a data processing system including a host and an associated memory system, the method comprising:
   transmitting process information indicating that a first process is classified as one of a critical process and a non-critical process to a kernel area, wherein the process information is generated in an application area, and the application area and the kernel area define the host;
   when the first process is classified as a critical process based on the process information, providing a first fastpath write signal to the memory system to perform a fastpath write operation of first data for performing the first process, wherein the first fastpath write signal is provided using the kernel area; and
   when the first process is classified as a non-critical process, providing a first slowpath write signal to the memory system to perform a slowpath write operation of the first data;
   wherein the fastpath write operation has a higher write speed than the slowpath write operation.

2. The method of claim 1, wherein the memory system comprises a unified memory controller, and a unified memory device including a first non-volatile memory and a second non-volatile memory; and further comprising:
   in response to receiving the first fastpath write signal, providing a second fastpath write signal to the unified memory device using the unified memory controller; and
   in response to receiving the first slowpath write signal, providing a second slowpath write signal to the unified memory device using the unified memory controller.

3. The method of claim 2, further comprising:
   in response to receiving the second fastpath write signal, performing the fastpath write operation to store the first data in the first non-volatile memory; and
   in response to receiving the second slowpath write signal, performing the slowpath write operation to store the first data in the second non-volatile memory.

4. The method of claim 2, further comprising, when the fastpath write operation has been completely performed, during an idle status period in which the first process is not being performed, performing a write operation of the first data to the second non-volatile memory; and wherein the first data is previously stored in the first non-volatile memory.

5. The method of claim 1, wherein, while the first process is performed, the process information indicates whether the first process is one of a critical process and a non-critical process, based on whether a synchronous write request is received.

6. The method of claim 1, further comprising performing a write operation of second data for performing a second process; and wherein the first process has priority over the second process, and the write operation of the second data is performed after a write operation of the first data for performing the first process has been completely performed.

7. The method of claim 6, further comprising when the first process is classified as a non-critical process and the second process is classified as a critical process, re-classifying the first process as a critical process.

8. The method of claim 7, further comprising when a write operation performed by the first process has been completely performed, re-classifying the first process as the non-critical process using the application area.

9. The method of claim 6, further comprising:
   performing a write operation of third data for performing a third process; and
   after the write operation of the first data for performing the first process has been completely performed, setting the second process to have priority over the third process and performing the write operation of the second data for performing the second process.

10. A data processing system comprising:
    a host including a kernel area and an application area; and
    a memory system;
    the host being configured to transmit process information, generated in the application area, and indicating that a first process is classified as one of a critical process and a non-critical process to the kernel area;
    the host being configured to, when the first process is classified as a critical process based on the process information, provide a first fastpath write signal, from the kernel area, to the memory system to perform a fastpath write operation of first data for performing the first process; and
    the host being configured to, when the first process is classified as a non-critical process, provide a first slowpath write signal, from the kernel area, to the memory system to perform a slowpath write operation of the first data;
    wherein the fastpath write operation has a higher write speed than the slowpath write operation.

11. The data processing system of claim 10, wherein the memory system comprises a unified memory controller, and a unified memory device including a first non-volatile memory and a second non-volatile memory; and wherein the unified memory controller is configured to provide a second fastpath write signal to the unified memory device in response to receiving the first fastpath write signal, and configured to provide a second slowpath write signal to the unified memory device in response receiving the first slowpath write signal.

12. The data processing system of claim 11, wherein the unified memory device is configured to perform the fastpath write operation to store the first data in the first non-volatile memory in response to receiving the second fastpath write signal, and configured to perform the slowpath write operation to store the first data in the second non-volatile memory in response to receiving the second slowpath write signal.

13. The data processing system of claim 11, wherein the unified memory device is configured to, when the fastpath write operation has been completely performed, during an idle status period in which the first process is not being performed, perform a write operation of the first data to the second non-volatile memory.

14. The data processing system of claim 10, wherein the process information indicates whether the first process is one of a critical process and a non-critical process based upon a synchronous write request.

* * * * *